United States Patent
Momose

(10) Patent No.: US 12,554,947 B2
(45) Date of Patent: Feb. 17, 2026

(54) CARD READER AND METHOD OF CONTROLLING CARD READER

(71) Applicant: NIDEC INSTRUMENTS CORPORATION, Nagano (JP)

(72) Inventor: Munemasa Momose, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 0 days.

(21) Appl. No.: 19/079,460

(22) Filed: Mar. 14, 2025

(65) Prior Publication Data
US 2025/0292038 A1 Sep. 18, 2025

(30) Foreign Application Priority Data
Mar. 15, 2024 (JP) ................. 2024-041204

(51) Int. Cl.
G06K 7/015 (2006.01)
(52) U.S. Cl.
CPC ................... *G06K 7/015* (2013.01)
(58) Field of Classification Search
CPC .... G06K 7/015; G06K 7/0021; G06K 7/0026; G06K 7/0069; G06K 13/08
See application file for complete search history.

(56) References Cited

U.S. PATENT DOCUMENTS

| | | | | |
|---|---|---|---|---|
| 5,331,138 A * | 7/1994 | Saroya | ............... | G06K 7/0021 235/492 |
| 5,594,233 A * | 1/1997 | Kenneth | ............... | G06K 7/0004 235/487 |
| 2003/0102375 A1* | 6/2003 | Watanabe | ............... | G06K 13/08 235/441 |
| 2015/0136850 A1* | 5/2015 | Akahane | ............... | G06K 7/084 235/438 |

FOREIGN PATENT DOCUMENTS

JP 2005-202466 A 7/2005

OTHER PUBLICATIONS

JP4422225B2—Smart card contact device, 24 pages. (Year: 2025).*
WO2016158948A1—Card Reader and Method for Controlling Card Reader, 46 pages. (Year: 2025).*

* cited by examiner

*Primary Examiner* — Tuyen K Vo
(74) *Attorney, Agent, or Firm* — HAUPTMAN HAM, LLP

(57) ABSTRACT

In a card reader, in a card moving step performed when activation of an IC chip fails in a first activation attempt step, a card is transported and stopped within a range where IC contact springs in contact with external connection terminals do not come off the external connection terminals, with an IC contact block positioned in a contactable position where the IC contact springs are allowed to contact the external connection terminals of the card. In such a card reader, in a second activation attempt step after the card moving step, the card is stopped within a range where the card is moved in the card moving step, then to attempt to activate the IC chip.

17 Claims, 8 Drawing Sheets

CARD READER AND METHOD OF CONTROLLING CARD READER

CROSS REFERENCE TO RELATED APPLICATION

The present invention claims priority under 35 U.S.C. § 119 to Japanese Application No. 2024-041204 filed Mar. 15, 2024, the entire content of which is incorporated herein by reference.

BACKGROUND

Field of the Invention

At least an embodiment of the present invention relates to a card reader and a method of controlling the card reader.

Description of the Related Documents

In the related art, an IC card connector device for processing an IC card is known (see, for example, Japanese Patent Application Laid-Open No. 2005-202466). The IC card connector device described in Japanese Patent Application Laid-Open No. 2005-202466 includes IC contact springs (contact electrodes) that contact external connection terminals (card contacts) of an IC chip formed on one surface of an IC card. The IC card connector device also includes a pair of rotating rollers to transport the IC card, and a brush-like cleaning member to clean the external connection terminals.

In the IC card connector device described in Japanese Patent Application Laid-Open No. 2005-202466, the IC card is moved back and forth by the rotating rollers, so that dirt and the like adhering to the external connection terminals of the IC card can be removed by the cleaning member. Therefore, with such an IC card connector device, even in processing an IC card with dirt or the like adhering to an external connection terminal, it is possible to establish electrical continuity between the external connection terminals and the IC contact spring and activate the IC chip.

As described above, the IC card connector device described in Japanese Patent Application Laid-Open No. 2005-202466 is capable of activating the IC chip even in processing the IC card with dirt or the like adhering to the external connection terminals. However, such an IC card connector device requires the cleaning member to remove dirt and the like adhering to the external connection terminals, which increases the number of parts in the IC card connector device and complicates the structure of the IC card connector device.

Therefore, an object of at least an embodiment of the present invention is to provide a card reader to communicate data with a card with an IC chip embedded and external connection terminals formed for the IC chip, which has a simple configuration and can increase the probability of activating the IC chip even in processing the card with dirt or the like adhering to the external connection terminals. Another object of at least an embodiment of the present invention is to provide a method of controlling a card reader to communicate data with a card with an IC chip embedded and external connection terminals formed for the IC chip, in which the card reader has a simple configuration and can increase the probability of activating the IC chip even in processing the card with dirt or the like adhering to the external connection terminals.

SUMMARY

To solve the above problem, a card reader according to one aspect of at least an embodiment of the present invention is a card reader to communicate data with a card with an IC chip embedded and a plurality of external connection terminals formed for the IC chip, and includes: a card transport path along which the card is transported; a card transport mechanism to transport the card along the card transport path; a plurality of IC contact springs to contact each of the plurality of external connection terminals to communicate data; an IC contact block to hold the plurality of IC contact springs; a block moving mechanism to move the IC contact block between a contactable position where the plurality of IC contact springs are allowed to contact the plurality of external connection terminals and a retreat position where the plurality of IC contact springs are not allowed to contact the plurality of external connection terminals; and a control unit to control the card reader, in which the control unit performs: a first activation attempt step of transporting the card to a predetermined reference position and stopping the card with the IC contact block positioned in the retreat position, and moving the IC contact block to the contactable position, then to attempt to activate the IC chip; a card moving step of, when activation of the IC chip fails in the first activation attempt step, transporting and stopping the card within a range where the plurality of IC contact springs in contact with the plurality of external connection terminals do not come off the plurality of external connection terminals, with the IC contact block positioned in the contactable position; and a second activation attempt step of, after the card moving step, stopping the card within a range where the card is moved in the card moving step, then to attempt to activate the IC chip.

To solve the above problem, a method of controlling a card reader according to one aspect of at least an embodiment of the present invention is a method of controlling a card reader including: a card transport path along which a card with an IC chip embedded and a plurality of external connection terminals formed for the IC chip is transported; a card transport mechanism to transport the card along the card transport path; a plurality of IC contact springs to contact each of the plurality of external connection terminals, to communicate data; an IC contact block to hold the plurality of IC contact springs; and a block moving mechanism to move the IC contact block between a contactable position where the plurality of IC contact springs are allowed to contact the plurality of external connection terminals and a retreat position where the plurality of IC contact springs are not allowed to contact the plurality of external connection terminals, the method including: a first activation attempt step of transporting the card to a predetermined reference position and stopping the card with the IC contact block positioned in the retreat position, and then moving the IC contact block to the contactable position, then to attempt to activate the IC chip; a card moving step of, when activation of the IC chip fails in the first activation attempt step, transporting and stopping the card within a range where the plurality of IC contact springs in contact with the plurality of external connection terminals do not come off the plurality of external connection terminals, with the IC contact block positioned in the contactable position; and a second activation attempt step of, after the card moving step, stopping the card within a range where the card is moved in the card moving step, then to attempt to activate the IC chip.

In such an aspect, in the card moving step performed when activation of the IC chip fails in the first activation attempt step, the card is transported and stopped within the range where the plurality of IC contact springs in contact with the plurality of external connection terminals do not come off the plurality of external connection terminals, with the IC contact block positioned in the contactable position where the plurality of IC contact springs are allowed to contact the plurality of external connection terminals. Therefore, in such an aspect, even though a cleaning member is not provided as in the IC card connector device described in Japanese Patent Application Laid-Open No. 2005-202466, it is possible to remove dirt and the like adhering to the plurality of external connection terminals by the plurality of IC contact springs. Thus, in such an aspect, it is possible to remove dirt and the like adhering to the plurality of external connection terminals with a simple configuration.

Further, in such an aspect, in the second activation attempt step after the card moving step, the card is stopped within the range where the card is moved in the card moving step, then to attempt to activate the IC chip. In other words, in such an aspect, in the second activation attempt step, an attempt is made to activate the IC chip after bringing the plurality of IC contact springs into contact with places of the plurality of external connection terminals from which dirt or the like is expected to be removed. Therefore, in such an aspect, even in processing a card with dirt or the like adhering to the plurality of external connection terminals by the card reader, it is possible to increase the probability that the IC chip can be activated. In other words, in such an aspect, even in processing a card with dirt or the like adhering to the plurality of external connection terminals by the card reader, it is possible to increase the probability that the IC chip can be activated with a simple configuration.

As described above, in one aspect of at least an embodiment of the present invention, a card reader to communicate data with a card with an IC chip embedded and external connection terminals formed for the IC chip, which has a simple configuration and can increase the probability of activating the IC chip even in processing the card with dirt or the like adhering to the external connection terminals, is provided.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Hereinafter, embodiments of the present invention will be described with reference to the drawings.

Configuration of Card Reader

Figure 1:
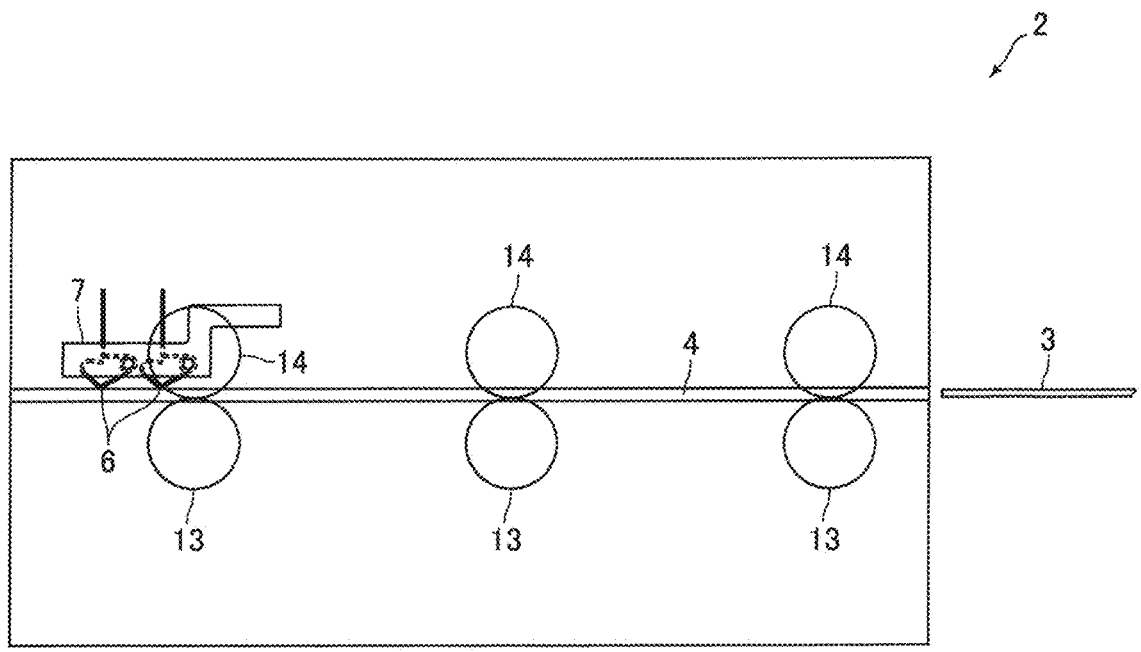
FIG. 1 is a schematic side view illustrating a configuration of a card reader according to an embodiment of the present invention.
Figure 1:
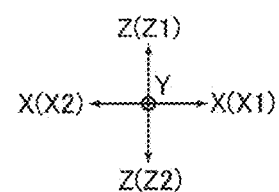
Figure 2:
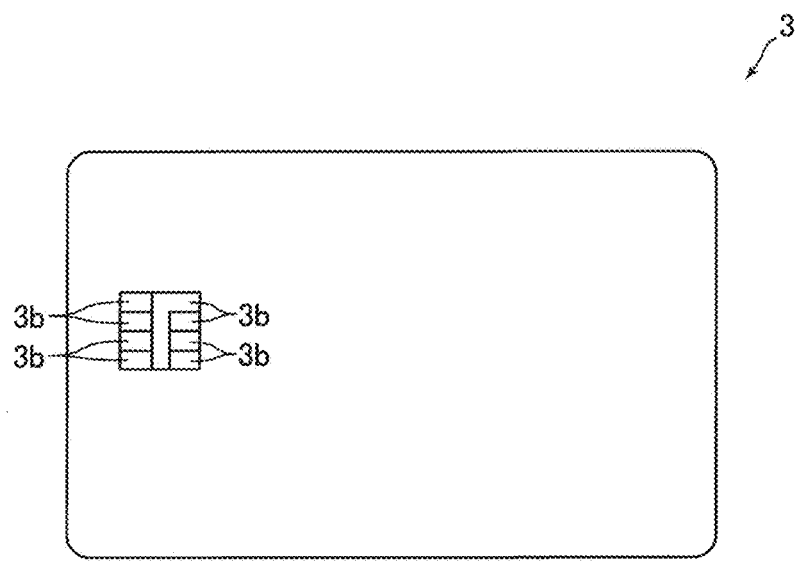
FIG. 2 is a plan view of a card illustrated in FIG. 1.
Figure 3:
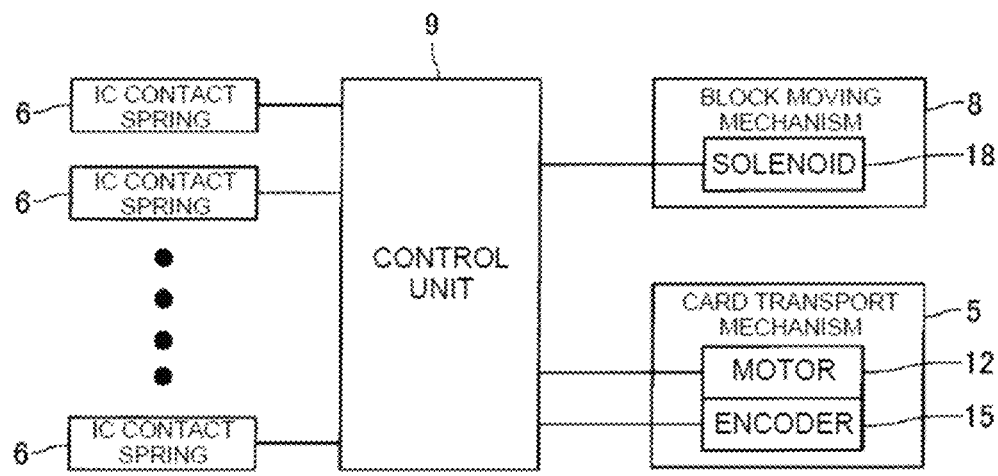
FIG. 3 is a block diagram illustrating a configuration of the card reader illustrated in FIG. 1.
Figure 4A:
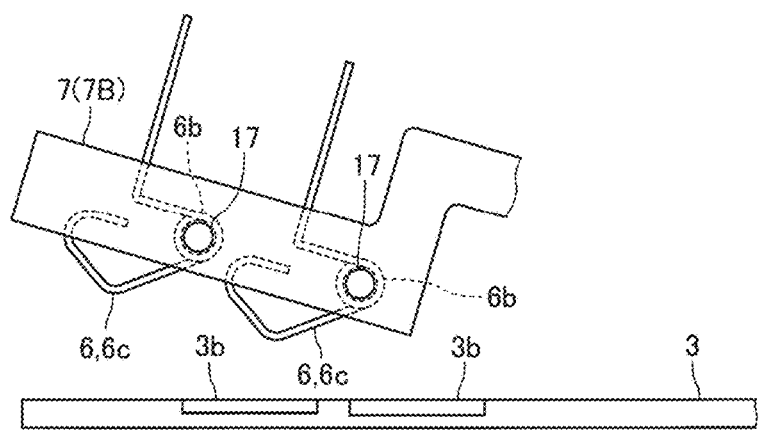
FIGS. 4A and 4B are side views illustrating an operation of an IC contact block illustrated in FIG. 1.
Figure 4B:
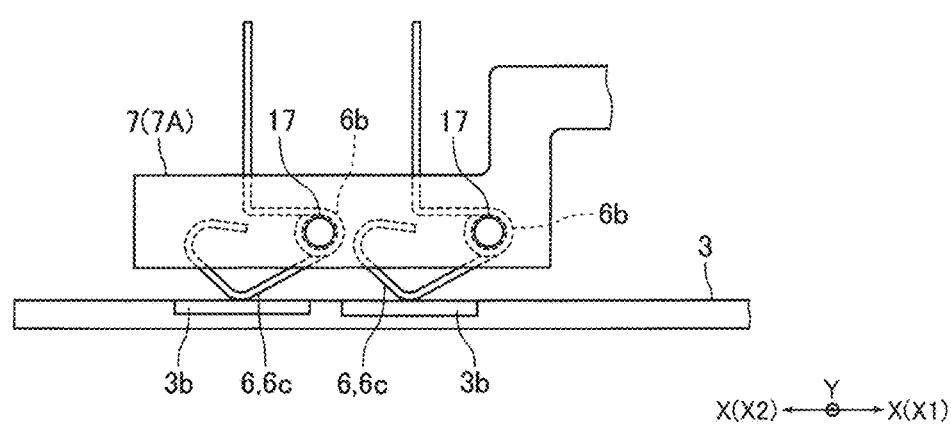

FIG. 1 is a schematic side view illustrating a configuration of a card reader 2 according to an embodiment of the present invention. FIG. 2 is a plan view of a card 3 illustrated in FIG. 1. FIG. 3 is a block diagram illustrating a configuration of the card reader 2 illustrated in FIG. 1. FIGS. 4A and 4B are side views illustrating an operation of an IC contact block 7 illustrated in FIG. 1. FIG. 4A is a diagram illustrating a state where the IC contact block 7 is positioned in a retreat position 7B, and FIG. 4B is a diagram illustrating a state where the IC contact block 7 is positioned in a contactable position 7A.

The card reader 2 according to the present embodiment is a device to communicate data with the card 3, which is a contact-type IC card, and is installed in a higher-level device such as an automatic teller machine (ATM) for use. The card 3 is a rectangular card being made of vinyl chloride and having a thickness of about 0.7 to 0.8 mm. The card 3 is also a card complying with international standards and JIS standards. An IC chip is embedded in the card 3, and a plurality of external connection terminals 3b for the IC chip are formed on one surface of the card 3 (specifically, the front surface of the card 3).

In the card 3, the plurality of external connection terminals 3b are arranged adjacent to each other in a direction of the short side (short side direction) of the rectangular card 3, and are also arranged in two rows in a direction of the long side (longitudinal direction) of the card 3. Specifically, four external connection terminals 3b arranged adjacent to each other in the short side direction of the card 3 are arranged in two rows in the long side direction of the card 3. The card 3 may be formed with a magnetic stripe or the like on which magnetic data is recorded. An antenna for communication connected to the IC chip may be embedded in the card 3.

Inside the card reader 2, a card transport path 4 is formed along which the card 3 inserted through a card slot is transported. The card reader 2 includes a card transport mechanism 5 to transport the card 3 along the card transport path 4. Thus, the card reader 2 is a card transport type of card reader. The card reader 2 includes a plurality of IC contact springs 6 to contact each of the plurality of external connection terminals 3b of the card 3, to communicate data, the IC contact block 7 to hold the plurality of IC contact springs 6, and a block moving mechanism 8 to move the IC contact block 7. The card reader 2 also includes a control unit 9 to control the card reader 2.

In the present embodiment, the card 3 is transported in an X direction in FIG. 1 and others, along the card transport path 4. In other words, the X direction is a direction in which the card 3 is transported by the card transport mechanism 5. A Z direction perpendicular to the X direction is a thickness direction of the card 3 transported along the card transport path 4, and a Y direction perpendicular to the X and Z directions is a width direction (short side width direction) of the card 3 transported along the card transport path 4. The card reader 2 is disposed, for example, so that the Z direction coincides with the vertical direction.

In the following description, an X1 direction side in FIG. 1 and others, which is one side in the front and back direction, will be referred to as the "front" side or "near" side, and an X2 direction side in FIG. 1 and others, which is the other side in the front and back direction, will be referred to as the "back" side or "far" side. A Z1 direction side in FIG. 1 and others, which is one side in the up and down direction, will be referred to as the "upper" side, and a Z2 direction side in FIG. 1 and others, which is the opposite side, will be referred to as the "lower" side. In the card reader 2, the card 3 is inserted toward the far side, and the card 3 is ejected toward the near side. Along the card transport path 4, the card 3 is transported so that the longitudinal direction of the rectangular card 3 coincides with the front and back direction.

The card transport mechanism 5 includes a motor 12 serving as a drive source. The card transport mechanism 5 also includes a plurality of drive rollers 13 and a plurality of pad rollers 14 arranged to face the drive rollers 13. Each drive roller 13 is coupled to the motor 12 via a predetermined power transmission mechanism. Each pad roller 14 is biased toward the corresponding drive roller 13. The card 3 is transported while being sandwiched between the drive roller 13 and the pad roller 14. The motor 12 is a DC motor. The motor 12 includes an encoder 15 to detect an amount of rotation and a rotation speed of the motor 12. The motor 12 and the encoder 15 are electrically connected to the control unit 9. The control unit 9 controls the motor 12, based on the detection result of the encoder 15 and the like to transport the card 3.

The IC contact block 7 is disposed to face the card transport path 4 from above. In the IC contact block 7, the plurality of IC contact springs 6 are arranged in the left and right direction, and are also arranged in two rows in the front and back direction. Specifically, four IC contact springs 6 arranged in the left and right direction are arranged in two rows in the front and back direction. The plurality of IC contact springs 6 held by the IC contact block 7 are electrically connected to the control unit 9.

Each IC contact spring 6 includes a held portion 6b held by the IC contact block 7, and a spring portion 6c being connected to the held portion 6b and extending backward from the held portion 6b. The held portion 6b is formed in a circular ring shape. The IC contact block 7 includes a holding shaft 17 disposed on the inner periphery side of the held portion 6b. The holding shaft 17 is disposed so that an axial direction of the holding shaft 17 coincides with a left and right direction. When viewed from the left and right direction, the spring portion 6c has a V-shape. An apex of the V-shaped spring portion 6c contacts the external connection terminal 3b of the card 3.

The block moving mechanism 8 includes a solenoid 18 serving as a drive source, and a power transmission mechanism to transmit the power of the solenoid 18 to the IC contact block 7. The block moving mechanism 8 moves the IC contact block 7 between the contactable position 7A (see FIG. 4B) where the IC contact springs 6 are allowed to contact the external connection terminals 3b of the card 3, and the retreat position 7B where the IC contact springs 6 are not allowed to contact the external connection terminals 3b of the card 3 (i.e., the retreat position 7B where the IC contact springs 6 retract upward from the card transport path 4 not to contact the external connection terminals 3b, see FIG. 4A). The solenoid 18 is electrically connected to the control unit 9. The control unit 9 controls the solenoid 18 to move the IC contact block 7 between the contactable position 7A and the retreat position 7B.

In the present embodiment, the block moving mechanism 8 pivots the IC contact block 7 between the contactable position 7A and the retreat position 7B with the left and right direction as an axis of pivot. The block moving mechanism 8 also pivots the IC contact block 7 around a front end of the IC contact block 7 between the contactable position 7A and the retreat position 7B. The power transmission mechanism to transmit the power of the solenoid 18 to the IC contact block 7, includes, for example, a link lever pivotable with the left and right direction as the axis of pivot. The block moving mechanism 8 also includes, for example, a spring member to bias the link lever in a direction in which the IC contact block 7 moves toward the retreat position 7B. When the solenoid 18 is in a non-energized state, the IC contact block 7 is positioned in the retreat position 7B by a biasing force of the spring member. When the solenoid 18 is energized, the IC contact block 7 positioned in the retreat position 7B moves to the contactable position 7A.

Method of Controlling Card Reader

Figure 5:
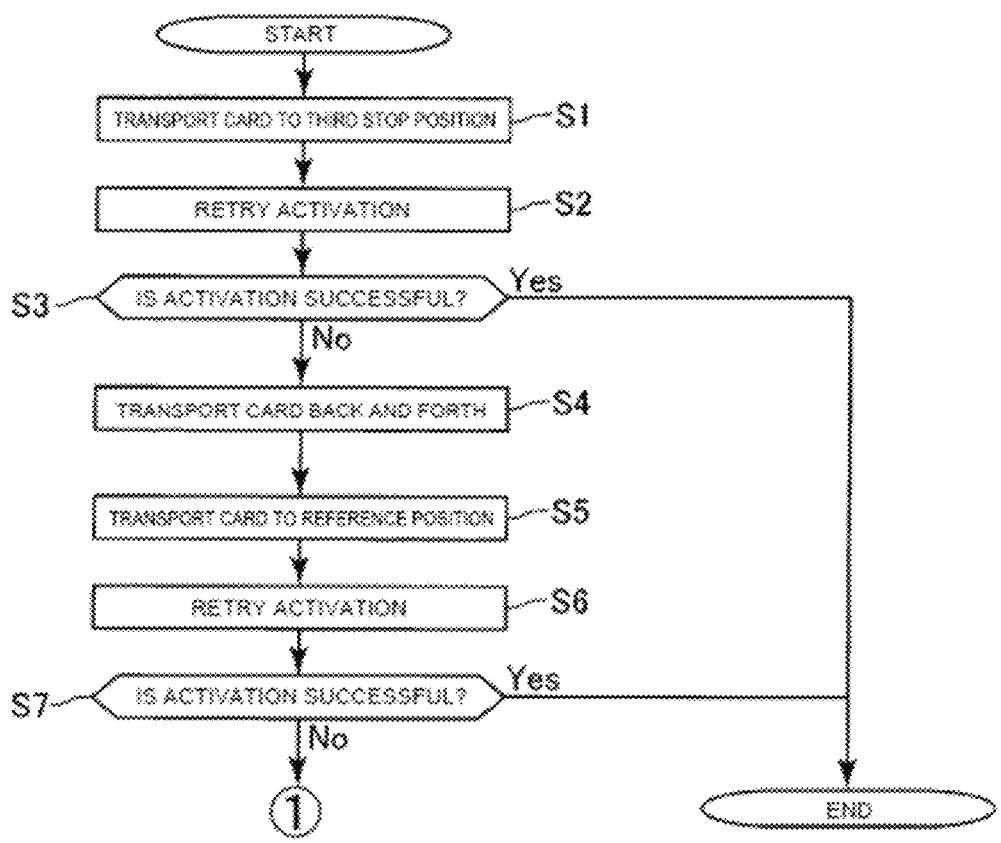
FIG. 5 is a flowchart illustrating an example of a method of controlling the card reader when activation of an IC chip in the card reader illustrated in FIG. 1 fails.
Figure 6:
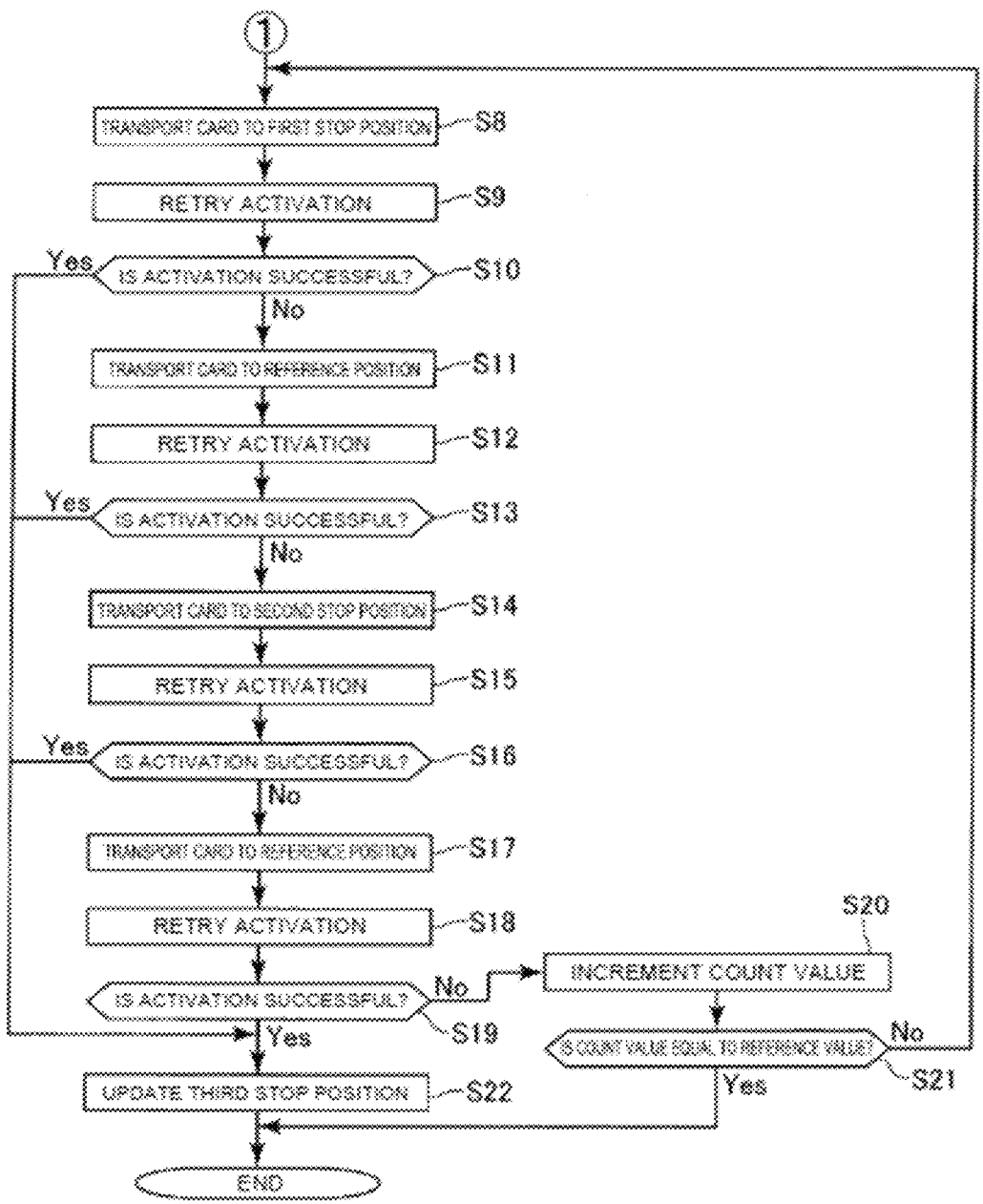
FIG. 6 is a flowchart illustrating the example of the method of controlling the card reader when activation of the IC chip in the card reader illustrated in FIG. 1 fails.
Figure 7A:
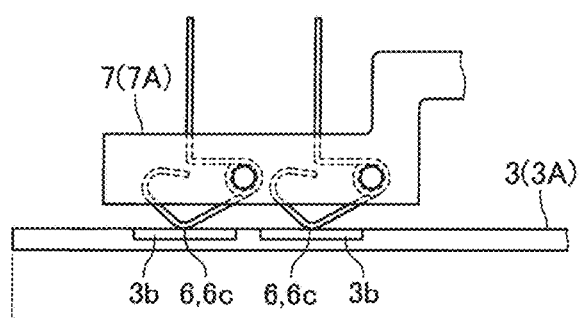
FIGS. 7A to 7E are side views illustrating an example of the method of controlling the card reader when activation of the IC chip in the card reader illustrated in FIG. 1 fails.
Figure 7B:
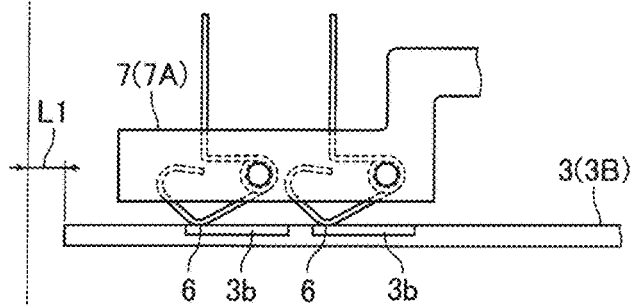
Figure 7C:
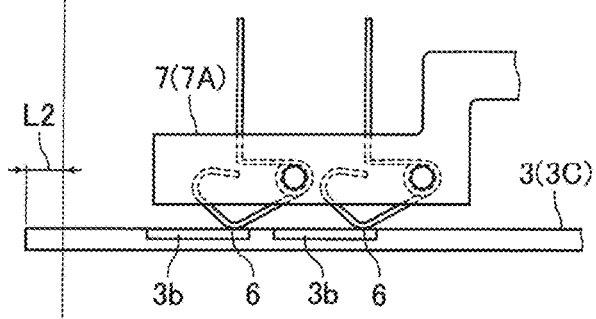
Figure 7D:
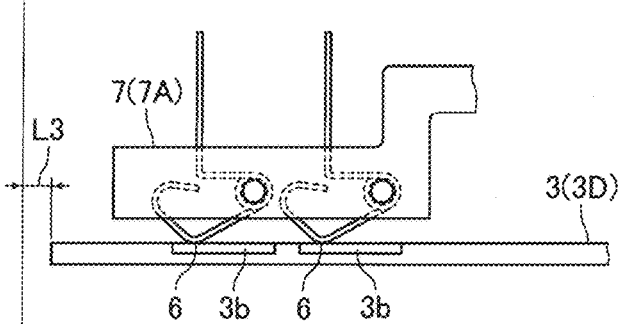
Figure 7E:
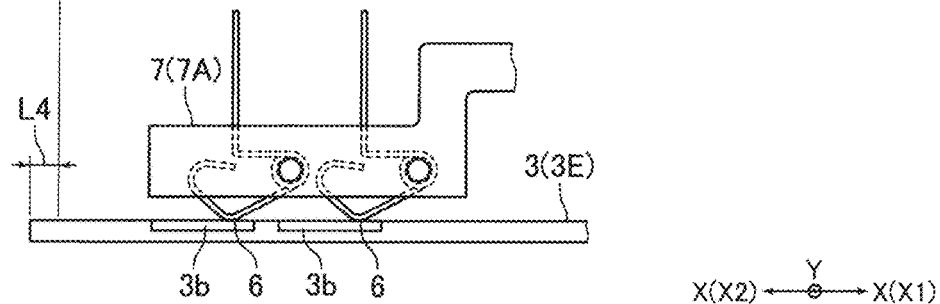

FIGS. 5 and 6 are flowchart illustrating an example of a method of controlling the card reader 2 when activation of the IC chip in the card reader 2 illustrated in FIG. 1 fails. FIGS. 7A to 7E are side views illustrating an example of the method of controlling the card reader 2 when activation of the IC chip in the card reader 2 illustrated in FIG. 1 fails. FIG. 7A is a diagram illustrating a state in which the card 3 is positioned in a reference position 3A, FIG. 7B is a diagram illustrating a state in which the card 3 is positioned in a first moving position 3B, FIG. 7C is a diagram illustrating a state in which the card 3 is positioned in a second moving position 3C. FIG. 7D is a diagram illustrating a state in which the card 3 is positioned in a first stop position 3D, and FIG. 7E is a diagram illustrating a state in which the card 3 is positioned in a second stop position 3E.

The card reader 2 communicates data with the card 3 with the IC contact block 7 positioned in the contactable position 7A. In communicating data between the card reader 2 and the card 3, the control unit 9 first supplies electric power to the IC chip embedded in the card 3 via the IC contact springs 6 and the external connection terminals 3b, and performs predetermined initial response processing between the control unit 9 and the IC chip. In other words, in communicating data between the card reader 2 and the card 3, the control unit 9 first supplies electric power to the IC chip embedded in the card 3, then to attempt to activate the IC chip.

Specifically, the control unit 9 transports the card 3 to the predetermined reference position 3A and stops the card 3, with the IC contact block 7 positioned in the retreat position 7B, and then moves the IC contact block 7 to the contactable position 7A, then to attempt to activate the IC chip (first activation attempt step). When the card 3 is positioned in the reference position 3A, the apex of each V-shaped spring portion 6c contacts, for example, the center of the corresponding external connection terminal 3b in the front and back direction (see FIG. 7A). The reference position 3A is stored in the control unit 9, and the control unit 9 controls the motor 12 to transport the card 3 to the reference position 3A and stop the card 3 there.

If the activation of the IC chip is successful in the first activation attempt step, the control unit 9 continues to communicate data with the card 3. On the other hand, if dirt or the like adheres to the external connection terminals 3b so that the electrical connection state between the IC contact springs 6 and the external connection terminals 3*b* is unstable, the activation of the IC chip may fail in the first activation attempt step. An example of the method of controlling the card reader 2 when the activation of the IC chip fails in the first activation attempt step will be described below. Hereinafter, the control of the card reader 2 that is performed when the activation of the IC chip fails in the first activation attempt step is referred to as "activation retry control".

If the activation of the IC chip fails in the first activation attempt step, the control unit 9 first moves the IC contact block 7 to the retreat position 7B, and then transports the card 3 to a predetermined third stop position and stops the card 3 there (step S1). The third stop position is stored in the control unit 9, and in step S1, the control unit 9 controls the motor 12 to transport the card 3 to the third stop position and stop the card 3 there. The third stop position is initially set to the reference position 3A, and in step S1, for example, the control unit 9 transports the card 3 to the reference position 3A and stops the card 3 there. It should be noted that if the card 3 is positioned in the third stop position at the end of the first activation attempt step, the transport of the card 3 in step S1 is skipped.

Thereafter, the control unit 9 moves the IC contact block 7 to the contactable position 7A, and then attempts to activate the IC chip again (step S2). In other words, the control unit 9 retries activation of the IC chip in step S2. Thereafter, the control unit 9 determines whether or not the activation of the IC chip in step S2 is successful (step S3). If the activation of the IC chip is successful in step S2 ("Yes" in step S3), the activation retry control ends and then the control unit 9 continues to communicate data with the card 3.

On the other hand, if the activation of the IC chip fails in step S2 ("No" in step S3), the control unit 9 transports the card 3 back and forth with the IC contact block 7 positioned in the contactable position 7A (i.e., with the IC contact springs 6 in contact with the external connection terminals 3*b*) and then stops the card 3 (step S4). In step S4, the control unit 9 transports and stops the card 3 within a range where the IC contact springs 6 in contact with the external connection terminals 3*b* do not come off the external connection terminals 3*b*. In the present embodiment, in step S4, the control unit 9 transports the card 3 between the first moving position 3B (see FIG. 7B) which is on the near side with respect to the reference position 3A and the second moving position 3C (see FIG. 7C) which is on the far side with respect to the reference position 3A.

In the present embodiment, an amount of forward/backward shift L1 between the card 3 positioned in the reference position 3A and the card 3 positioned in the first moving position 3B is equal to an amount of forward/backward shift L2 between the card 3 positioned in the reference position 3A and the card 3 positioned in the second moving position 3C. However, the amount of shift L1 and the amount of shift L2 may be different. When the card 3 is positioned in the first moving position 3B, the apex of each spring portion 6*c* contacts a place of the corresponding external connection terminal 3*b* that is slightly forward of the rear end (far end). When the card 3 is positioned in the second moving position 3C, the apex of each spring portion 6*c* contacts a place of the corresponding external connection terminal 3*b* that is slightly backward of the front end (near end).

The first moving position 3B and the second moving position 3C are stored in the control unit 9, and the control unit 9 controls the motor 12 to transport the card 3 between the first moving position 3B and the second moving position 3C and stop the card 3. In step S4, the control unit 9 transports the card 3 back and forth a number of times. For example, in step S4, the control unit 9 transports the card 3 back and forth three times. However, in step S4, the control unit 9 may transport the card 3 back and forth only once.

Thereafter, the control unit 9 transports the card 3 to the reference position 3A and stops the card 3 there, with the IC contact block 7 still positioned in the contactable position 7A (step S5). Thereafter, the control unit 9 attempts to activate the IC chip again (step S6). In other words, the control unit 9 retries activation of the IC chip in step S6. Thereafter, the control unit 9 determines whether or not the activation of the IC chip in step S6 is successful (step S7). If the activation of the IC chip is successful in step S6, the activation retry control ends, and the control unit 9 continues to communicate data with the card 3. It should be noted that if the card 3 is positioned in the reference position 3A at the end of step S4, step S5 is skipped.

When the position of the card 3 that is on the far side with respect to the first moving position 3B and is on the near side with respect to the reference position 3A is defined as the first stop position 3D (see FIG. 7D); and the position of the card 3 that is on the near side with respect to the second moving position 3C and is on the far side with respect to the reference position 3A is defined as the second stop position 3E (see FIG. 7E), if the activation of the IC chip fails in step S6, then the control unit 9 transports the card 3 to the first stop position 3D and stops the card 3 with the IC contact block 7 positioned in the contactable position 7A (i.e., with the IC contact springs 6 in contact with the external connection terminals 3*b*) (step S8).

The first stop position 3D is stored in the control unit 9, and in step S8, the control unit 9 controls the motor 12 to transport the card 3 to the first stop position 3D and stop the card 3 there. In the present embodiment, an amount of forward/backward shift L3 between the card 3 positioned in the reference position 3A and the card 3 positioned in the first stop position 3D is equal to an amount of forward/backward shift L4 between the card 3 positioned in the reference position 3A and the card 3 positioned in the second stop position 3E. The amounts of shift L3 and LA are each, for example, 0.6 to 0.7 (mm). The amount of shift L3 and the amount of shift LA may be different.

Thereafter, the control unit 9 attempts to activate the IC chip again (step S9). In other words, the control unit 9 retries activation of the IC chip in step S9. Thereafter, the control unit 9 determines whether or not the activation of the IC chip in step S9 is successful (step S10). If the activation of the IC chip is successful in step S9, the control unit 9 updates the third stop position to set the first stop position 3D to the third stop position (step S22). When the updating of the third stop position is completed in step S22, the activation retry control ends, and the control unit 9 continues to communicate data with the card 3.

On the other hand, if the activation of the IC chip fails in step S9, the control unit 9 transports the card 3 to the reference position 3A and stops the card 3 there, with the IC contact block 7 positioned in the contactable position 7A (step S11). Thereafter, the control unit 9 attempts to activate the IC chip again (step S12). Thereafter, the control unit 9 determines whether or not the activation of the IC chip in step S12 is successful (step S13). If the activation of the IC chip is successful in step S12, the processing proceeds to step S22. When the processing proceeds from step S13 to step S22, then in step S22, the control unit 9 updates the third stop position to set the reference position 3A to the third stop position.

On the other hand, if the activation of the IC chip fails in step S12, the control unit 9 transports the card 3 to the second stop position 3E and stops the card 3 there, with the IC contact block 7 positioned in the contactable position 7A (step S14). The second stop position 3E is stored in the control unit 9, and in step S14, the control unit 9 controls the motor 12 to transport the card 3 to the second stop position 3E and stop the card 3 there. Thereafter, the control unit 9 attempts to activate the IC chip again (step S15). Thereafter, the control unit 9 determines whether or not the activation of the IC chip in step S15 is successful (step S16). If the activation of the IC chip is successful in step S15, the processing proceeds to step S22. When the processing proceeds from step S16 to step S22, the control unit 9 updates the third stop position in step S22 to set the second stop position 3E to the third stop position.

On the other hand, if the activation of the IC chip fails in step S15, the control unit 9 transports the card 3 to the reference position 3A and stops the card 3 there, with the IC contact block 7 positioned in the contactable position 7A (step S17). Thereafter, the control unit 9 attempts to activate the IC chip again (step S18). Thereafter, the control unit 9 determines whether or not the activation of the IC chip in step S18 is successful (step S19). If the activation of the IC chip is successful in step S18, the processing proceeds to step S22. When the processing proceeds from step S19 to step S22, the control unit 9 updates the third stop position in step S22 to set the reference position 3A to the third stop position.

On the other hand, if the activation of the IC chip fails in step S18, the control unit 9 increments a count value indicating the number of times steps S8 to S19 are repeated (step S20). Specifically, in step S20, the control unit 9 increments the count value stored in the control unit 9 by one. In the first step S20 after the activation retry control is started, the count value is "1". Thereafter, the control unit 9 determines whether or not the count value is a predetermined reference value (step S21).

If the count value does not reach the reference value in step S21, the processing returns to step S8 where the control unit 9 transports the card 3 to the first stop position 3D and stops the card 3 there, with the IC contact block 7 positioned in the contactable position 7A. The reference value in step S21 is an integer of 2 or more. The reference value in the present embodiment is "3". Specifically, in step S21, it is determined whether or not steps S8 to S19 are repeated three times. On the other hand, if the count value reaches the reference value in step S21, the activation retry control ends. When the activation retry control ends through steps S20 and S21, the control unit 9 performs predetermined error processing without communicating data with the card 3. The reference value in step S21 may be "2" or may be "4" or more.

Step S4 in the present embodiment corresponds to a card moving step in which, when the activation of the IC chip fails in the first activation attempt step, the card 3 is transported and stopped within a range where the IC contact springs 6 in contact with the external connection terminals 3b do not come off the external connection terminals 3b, with the IC contact block 7 positioned in the contactable position 7A. Steps S8 to S21 in the present embodiment correspond to a second activation attempt step in which, after the card moving step, the card 3 is stopped within a range where the card 3 is moved in the card moving step, then to attempt to activate the IC chip. In other words, in the present embodiment, the control unit 9 performs the first activation attempt step, the card moving step, and the second activation attempt step.

In step S4, which corresponds to the card moving step, the control unit 9 transports the card 3 between the first moving position 3B and the second moving position 3C. In the second activation attempt step, the control unit 9 transports and stops the card 3 with the IC contact block 7 positioned in the contactable position 7A. Specifically, in steps S8, S11, S14, and S17, the control unit 9 transports and stops the card 3 with the IC contact block 7 positioned in the contactable position 7A.

In the second activation attempt step, the control unit 9 attempts to activate the IC chip a predetermined number of times while changing the stop position of the card 3 until the activation of the IC chip is successful. Specifically, in the second activation attempt step, the control unit 9 attempts to activate the IC chip while changing the stop position of the card 3 between the first stop position 3D, the second stop position 3E, and the reference position 3A until the activation of the IC chip is successful. More specifically, in the second activation attempt step, the control unit 9 repeats one cycle of activation attempts a plurality of times (specifically three times) in which the control unit 9 attempts to activate the IC chip while changing the stop position of the card 3 in the order of the first stop position 3D, the reference position 3A, the second stop position 3E, and the reference position 3A, until the activation of the IC chip is successful.

Steps S1 to S3 in the present embodiment correspond to a third activation attempt step in which an attempt is made to activate the IC chip again with the card 3 stopped in the third stop position, and if the activation of the IC chip fails in the first activation attempt step, the control unit 9 performs the third activation attempt step before performing step S4, which is the card moving step. Step S22 in the present embodiment corresponds to a stop position update step in which the stop position of the card 3 when the activation of the IC chip is successful is set to the third stop position, and the control unit 9 performs the stop position update step if the activation of the IC chip is successful in the second activation attempt step (specifically, if the activation of the IC chip is successful in steps S9, S12, S15, and S18).

Main Advantageous Effects of Present Embodiment

As described above, in the present embodiment, in step S4, which is performed when the activation of the IC chip fails in the first activation attempt step, the card 3 is transported and stopped within a range where the IC contact springs 6 in contact with the external connection terminals 3b do not come off the external connection terminals 3b, with the IC contact block 7 positioned in the contactable position 7A where the IC contact springs 6 are allowed to contact the external connection terminals 3b. Therefore, in the present embodiment, even though the cleaning member described in Japanese Patent Application Laid-Open No. 2005-202466 is not provided, it is possible to remove dirt and the like adhering to the external connection terminals 3b by the IC contact springs 6. Thus, in the present embodiment, it is possible to remove dirt and the like adhering to the external connection terminals 3b with a simple configuration.

In the present embodiment, in steps S8 to S21, the card 3 is stopped within the range where the card 3 is moved in step S4, then to attempt to activate the IC chip. In other words, in the present embodiment, an attempt is made to activate the IC chip after bringing the IC contact springs 6 into contact with places of the external connection terminals 3b from which dirt or the like is expected to are removed. Therefore, in the present embodiment, even in processing the card 3 with dirt or the like adhering to the external connection terminals 3b by the card reader 2, it is possible to increase the probability that the IC chip can be activated. In other words, in the present embodiment, even in processing the card 3 with dirt or the like adhering to the external connection terminals 3b by the card reader 2, it is possible to increase the probability that the IC chip can be activated with a simple configuration.

In the present embodiment, in steps S8, S11, S14, and S17, the card 3 is transported and stopped with the IC contact block 7 positioned in the contactable position 7A. Therefore, in the present embodiment, it is possible to shorten the processing time in steps S8 to S21, compared to a case where, in steps S8, S11, S14, and S17, the IC contact block 7 is retreated to the retreat position 7B, the card 3 is transported and stopped, and then, in steps S9, S12, S15, and S18, the IC contact block 7 is moved to the contactable position 7A, then to attempt to activate the IC chip.

In the present embodiment, in steps S8 to S21, an attempt is made to activate the IC chip a predetermined number of times while changing the stop position of the card 3 until the activation of the IC chip is successful. Therefore, in the present embodiment, it is possible to further increase the probability that the IC chip can be activated. In the present embodiment, an attempt is made to activate the IC chip even with the card 3 stopped in the first stop position 3D and the second stop position 3E; the IC contact springs 6 are brought into contact with places of the external connection terminals 3b that are on the near side with respect to places where the IC contact springs 6 contact when the card 3 is positioned in the reference position 3A, then to attempt to activate the IC chip; and the IC contact springs 6 are brought into contact with places of the external connection terminals 3b that are on the far side with respect to places where the IC contact springs 6 contact when the card 3 is positioned in the reference position 3A, then to attempt to activate the IC chip. Therefore, in the present embodiment, it is possible to further increase the probability that the IC chip can be activated.

In the present embodiment, in steps S8 to S21, an attempt is made to activate the IC chip while changing the stop position of the card 3 in the order of the first stop position 3D, the reference position 3A, the second stop position 3E, and the reference position 3A, until the activation of the IC chip is successful. Thus, in the present embodiment, it is possible to shorten the movement time of the card 3 to change the stop position of the card 3. Therefore, in the present embodiment, it is possible to further increase the probability that the IC chip can be activated, and also to shorten the processing time in steps S8 to S21.

In the present embodiment, if the activation of the IC chip is successful in steps S9, S12, S15, and S18, the third stop position is updated in step S22 to set the stop position of the card 3 to the third stop position when the activation of the IC chip is successful. Thus, in the present embodiment, it is possible to increase the probability of successful activation of the IC chip in step S2.

First Modification of Control Method

In the embodiment described above, when the activation of the IC chip fails in step S18, the activation retry control may end directly. In other words, the control unit 9 may perform one cycle of activation attempts only once, in which an attempt is made to activate the IC chip while changing the stop position of the card 3 in the order of the first stop position 3D, the reference position 3A, the second stop position 3E, and the reference position 3A. When the activation of the IC chip fails in step S18 and the activation retry control ends directly, the control unit 9 performs predetermined error processing without communicating data with the card 3. In such a case, steps S20 and S21 are unnecessary.

In the embodiment described above, the control unit 9 may transport the card 3 to the second stop position 3E in step S8 and stop the card 3 there, and may transport the card 3 to the first stop position 3D in step S14 and stop the card 3 there. In the embodiment described above, in the second activation attempt step, the control unit 9 may repeat one cycle of activation attempts a plurality of times, in which an attempt is made to activate the IC chip while changing the stop position of the card 3 in the order of the first stop position 3D, the reference position 3A, and the second stop position 3E. Thus, in the embodiment described above, steps S17 to S19 may be skipped. In the second activation attempt step, the control unit 9 may repeat one cycle of activation attempts a plurality of times, in which an attempt is made to activate the IC chip while changing the stop position of the card 3 in the order of the second stop position 3E, the reference position 3A, and the first stop position 3D.

In the embodiment described above, in the second activation attempt step, the control unit 9 may attempt to activate the IC chip while alternately changing the stop position of the card 3 between the first stop position 3D and the reference position 3A. In the embodiment described above, the control unit 9 may attempt to activate the IC chip in the second activation attempt step while alternately changing the stop position of the card 3 between the second stop position 3E and the reference position 3A.

Second Modification of Control Method

Figure 8A:
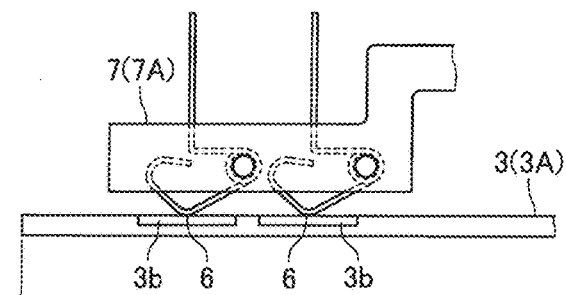
FIGS. 8A to 8D are side views illustrating a method of controlling a card reader according to another embodiment of the present invention.
Figure 8B:
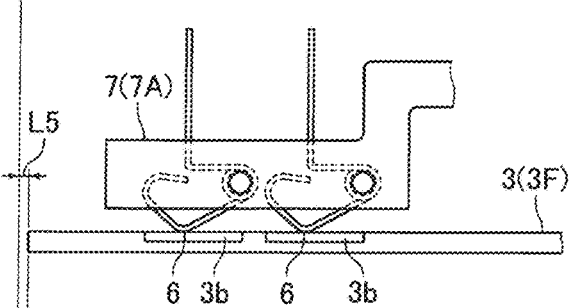
Figure 8C:
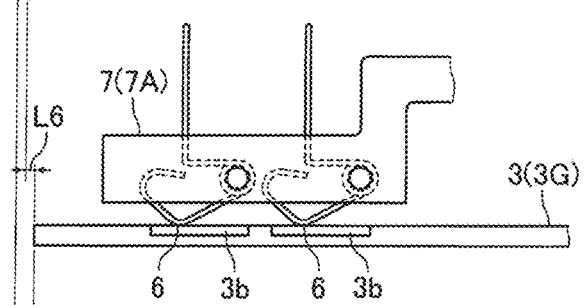
Figure 8D:
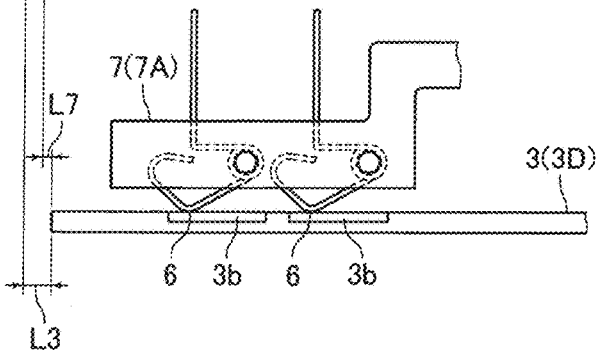
Figure 9A:
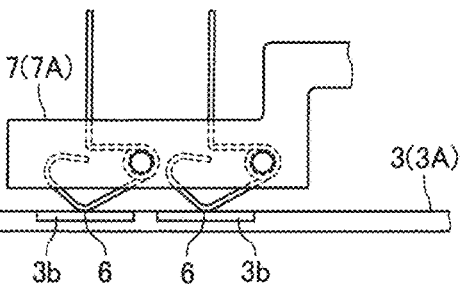
FIGS. 9A to 9D are side views illustrating a method of controlling a card reader according to still another embodiment of the present invention.
Figure 9B:
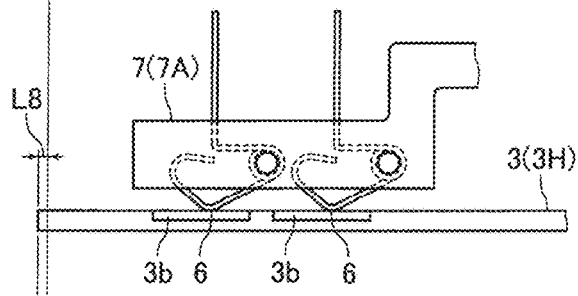
Figure 9C:
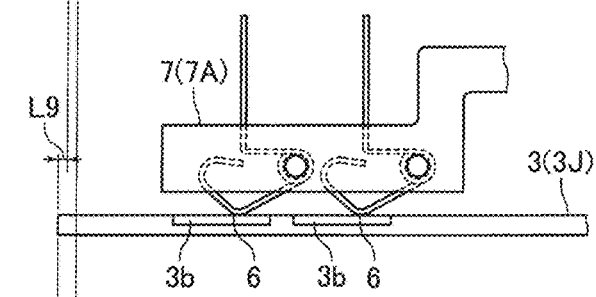
Figure 9D:
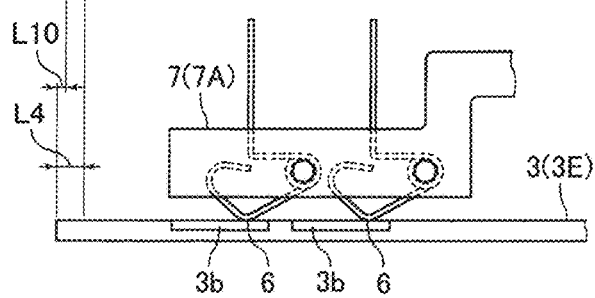

FIGS. 8A to 8D are side views illustrating a method of controlling the card reader 2 according to another embodiment of the present invention. FIG. 8A is a diagram illustrating a state where the card 3 is positioned in the reference position 3A, FIG. 8B is a diagram illustrating a state where the card 3 is positioned in a fifth stop position 3F, FIG. 8C is a diagram illustrating a state where the card 3 is positioned in a sixth stop position 3G, and FIG. 8D is a diagram illustrating a state where the card 3 is positioned in the first stop position 3D. FIGS. 9A to 9D are side views illustrating a method of controlling the card reader 2 according to still another embodiment of the present invention. FIG. 9A is a diagram illustrating a state where the card 3 is positioned in the reference position 3A, FIG. 9B is a diagram illustrating a state where the card 3 is positioned in a seventh stop position 3H, FIG. 9C is a diagram illustrating a state where the card 3 is positioned in an eighth stop position 3J, and FIG. 9D is a diagram illustrating a state where the card 3 is positioned in the second stop position 3E.

In the embodiments described above, in the second activation attempt step, the control unit 9 may attempt to activate the IC chip while gradually changing the stop position of the card 3 from the reference position 3A toward the first moving position 3B until the activation of the IC chip is successful, then attempt to activate the IC chip while gradually changing the stop position of the card 3 from the first moving position 3B toward the second moving position 3C, and finally attempt to activate the IC chip while gradually changing the stop position of the card 3 from the second moving position 3C toward the first moving position 3B.

In such a case, for example, when the position of the card 3 between the reference position 3A and the first stop position 3D is defined as the fifth stop position 3F (see FIG. 8B); the position of the card 3 between the fifth stop position 3F and the first stop position 3D is defined as the sixth stop position 3G (see FIG. 8C); the position of the card 3 between the reference position 3A and the second stop position 3E is defined as the seventh stop position 3H (see FIG. 9B); and the position of the card 3 between the seventh stop position 3H and the second stop position 3E is defined as the eighth stop position 3J (see FIG. 9C), then in the second activation attempt step, the control unit 9 repeats one cycle of activation attempts a plurality of times, in which an attempt is made to activate the IC chip while changing the stop position of the card 3 in the order of the fifth stop position 3F, the sixth stop position 3G, the first stop position 3D, the sixth stop position 3G, the fifth stop position 3F, the reference position 3A, the seventh stop position 3H, the eighth stop position 3J, the second stop position 3E, the eighth stop position 3J, the seventh stop position 3H, and the reference position 3A. Alternatively, the control unit 9 performs one cycle of activation attempts only once in the second activation attempt step.

An amount of forward/backward shift L5 between the card 3 positioned in the reference position 3A and the card 3 positioned in the fifth stop position 3F, an amount of forward/backward shift L6 between the card 3 positioned in the fifth stop position 3F and the card 3 positioned in the sixth stop position 3G, and an amount of forward/backward shift L7 between the card 3 positioned in the sixth stop position 3G and the card 3 positioned in the first stop position 3D are equal. An amount of forward/backward shift L8 between the card 3 positioned in the reference position 3A and the card 3 positioned in the seventh stop position 3H, an amount of forward/backward shift L9 between the card 3 positioned in the seventh stop position 3H and the card 3 positioned in the eighth stop position 3J, and an amount of forward/backward shift L10 between the card 3 positioned in the eighth stop position 3J and the card 3 positioned in the second stop position 3E are equal. The amount of shift L5 and the amount of shift L8 are equal. However, the amount of shift L5 and the amount of shift L8 may be different. Any one of the amounts of shift L5, L6, and L7 may be an amount of shift different from the other amounts of shift, and any one of the amounts of shift L8, L9, and L10 may be an amount of shift different from the other amounts of shift.

In such a modification, it is possible to shorten the movement time of the card 3 to change the stop position of the card 3. Therefore, even though it is possible to further increase the probability that the IC chip can be activated, it is possible to shorten the processing time in the second activation attempt step. In such a modification, the IC contact springs 6 are brought into contact with places of the external connection terminals 3b that are on the near side with respect to places where the IC contact springs 6 contact when the card 3 is positioned in the reference position 3A, then to attempt to active the IC chip; and the IC contact springs 6 are brought into contact with places of the external connection terminals 3b that are on the far side with respect to places where the IC contact springs 6 contact when the card 3 is positioned in the reference position 3A, then to activate the IC chip, thereby making it possible to further increase the probability that the IC chip can be activated.

Third Modification of Control Method

In the second modification described above, in the second activation attempt step, the control unit 9 may attempt to activate the IC chip while gradually changing the stop position of the card 3 from the reference position 3A toward the first moving position 3B until the activation of the IC chip is successful. In other words, in the second activation attempt step, the control unit 9 may attempt to activate the IC chip while moving the card 3 only from the reference position 3A toward the first moving position 3B until the activation of the IC chip is successful. Specifically, in the second activation attempt step, the control unit 9 may repeat one cycle of activation attempts either a plurality of times or only once, in which an attempt is made to activate the IC chip while changing the stop position of the card 3 in the order of the fifth stop position 3F, the sixth stop position 3G, and the first stop position 3D. In such a case, in the card moving step, the card 3 may be transported only between the reference position 3A and the first moving position 3B.

Similarly, In the second modification, in the second activation attempt step, the control unit 9 may attempt to activate the IC chip while gradually changing the stop position of the card 3 from the reference position 3A toward the second moving position 3C until the activation of the IC chip is successful. In such a case, in the card moving step, the card 3 may be transported only between the reference position 3A and the second moving position 3C.

In the second modification, in the second activation attempt step, the control unit 9 may attempt to activate the IC chip while gradually changing the stop position of the card 3 from the reference position 3A toward the first moving position 3B until the activation of the IC chip is successful, and then attempt to activate the IC chip while gradually changing the stop position of the card 3 from the first moving position 3B toward the reference position 3A. Similarly, in the second modification, in the second activation attempt step, the control unit 9 may attempt to activate the IC chip while gradually changing the stop position of the card 3 from the reference position 3A toward the second moving position 3C until the activation of the IC chip is successful, and then attempt to activate the IC chip while gradually changing the stop position of the card 3 from the second moving position 3C toward the reference position 3A.

In the second modification, in the second activation attempt step, the control unit 9 may attempt to activate the IC chip while gradually changing the stop position of the card 3 from the reference position 3A toward the first moving position 3B until the activation of the IC chip is successful, and then attempt to activate the IC chip while gradually changing the stop position of the card 3 from the first moving position 3B toward the second moving position 3E, or the control unit 9 may attempt to activate the IC chip while gradually changing the stop position of the card 3 from the reference position 3A toward the second moving position 3C until the activation of the IC chip is successful, and then attempt to activate the IC chip while gradually changing the stop position of the card 3 from the second moving position 3C toward the first moving position 3B.

Other Embodiments

The embodiments described above are examples of preferred embodiments of the present invention, but the present invention is not limited to the embodiments and various modifications can be made without departing from the spirit of the present invention.

In the embodiments described above, the control unit 9 may make the current supplied to the solenoid 18 when moving the IC contact block 7 from the retreat position 7B to the contactable position 7A in step S2 greater than the current supplied to the solenoid 18 when moving the IC contact block 7 from the retreat position 7B to the contactable position 7A in the first activation attempt step. For example, the control unit 9 may supply the maximum current to the solenoid 18 in step S2. In such a case, the moving speed of the IC contact block 7 is faster in step S2, and the impact when the IC contact springs 6 contact the external connection terminals 3b is larger accordingly. Therefore, in step S2, the probability that dirt or the like adhering to the external connection terminals 3b will be removed increases, and as a result, it is possible to increase the probability that the IC chip will be successfully activated.

In the embodiments described above, the control unit 9 may move the IC contact block 7 positioned in the contactable position 7A to the retreat position 7B in steps S8, S11. S14, and S17, and then transport and stop the card 3 with the IC contact block 7 positioned in the retreat position 7B, and move the IC contact block 7 positioned in the retreat position 7B to the contactable position 7A in steps S9, S12, S15, and S18. Similarly, in the modifications described above, in the second activation attempt step, the control unit 9 may move the IC contact block 7 positioned in the contactable position 7A to the retreat position 7B, and then transport and stop the card 3 with the IC contact block 7 positioned in the retreat position 7B.

In the embodiments described above, the control unit 9 may stop the card 3 in only one of the first stop position 3D and the second stop position 3E after step S7, then to attempt to activate the IC chip. In the embodiments described above, when the card 3 is positioned in the reference position 3A, the apex of each spring portion 6c may be in contact with a place offset from the center of the corresponding external connection terminal 3b in the front and back direction. Furthermore, in the embodiments described above, the motor 12 may be a stepping motor. In such a case, the encoder 15 is not necessary. In the embodiments described above, the card reader 2 may be a manual card reader.

In the embodiments described above, step S22 does not need to be performed. In the embodiments described above, when the activation of the IC chip fails in the first activation attempt step, the processing may proceed to step S4 directly. In other words, in the activation retry control, steps S1 to S3 do not need to be performed. In such a case, step S22 is not necessary. Furthermore, in the embodiments described above, the processing may proceed from step S4 to step S8 directly. In other words, in the activation retry control, steps S5 to S7 do not need to be performed.

Configuration of Present Technology

The present technology can be configured as follows.
(1) A card reader to communicate data with a card with an IC chip embedded and a plurality of external connection terminals formed for the IC chip, the card reader including:
a card transport path along which the card is transported; a card transport mechanism to transport the card along the card transport path; a plurality of IC contact springs to contact each of the plurality of external connection terminals to communicate data; an IC contact block to hold the plurality of IC contact springs; a block moving mechanism to move the IC contact block between a contactable position where the plurality of IC contact springs are allowed to contact the plurality of external connection terminals and a retreat position where the plurality of IC contact springs are not allowed to contact the plurality of external connection terminals; and a control unit to control the card reader,
wherein the control unit performs:
a first activation attempt step of transporting the card to a predetermined reference position and stopping the card with the IC contact block positioned in the retreat position, and moving the IC contact block to the contactable position, then to attempt to activate the IC chip;
a card moving step of, when activation of the IC chip fails in the first activation attempt step, transporting and stopping the card within a range where the plurality of IC contact springs in contact with the plurality of external connection terminals do not come off the plurality of external connection terminals, with the IC contact block positioned in the contactable position; and
a second activation attempt step of, after the card moving step, stopping the card within a range where the card is moved in the card moving step, then to attempt to activate the IC chip.
(2) The card reader according to (1), wherein in the second activation attempt step, the control unit transports and stops the card with the IC contact block positioned in the contactable position.
(3) The card reader according to (1) or (2), wherein in the second activation attempt step, the control unit attempts to activate the IC chip a predetermined number of times while changing a stop position of the card until activation of the IC chip is successful.
(4) The card reader according to (3), wherein when one side of a direction in which the card is transported by the card transport mechanism is defined as a near side, and the other side of the direction in which the card is transported by the card transport mechanism is defined as a far side,
in the card moving step, the control unit transports the card between a first moving position that is on the near side with respect to the reference position and a second moving position that is on the far side with respect to the reference position, and when a position of the card that is on the far side with respect to the first moving position and is on the near side with respect to the reference position is defined as a first stop position, and a position of the card that is on the near side with respect to the second moving position and is on the far side with respect to the reference position is defined as a second stop position, in the second activation attempt step, the control unit attempts to activate the IC chip while changing the stop position of the card among the first stop position, the second stop position, and the reference position until activation of the IC chip is successful.
(5) The card reader according to (4), wherein in the second activation attempt step, the control unit repeats one cycle of activation attempts a plurality of times, in which an attempt is made to activate the IC chip while changing the stop position of the card in an order of the first stop position, the reference position, the second stop position, and the reference position, until activation of the IC chip is successful.
(6) The card reader according to (3), wherein in the card moving step, the control unit transports the card at least between the reference position and a predetermined first moving position, and in the second activation attempt step, attempts to activate the IC chip while gradually changing the stop position of the card from the reference position toward the first moving position until activation of the IC chip is successful.
(7) The card reader according to (6), wherein in the card moving step, the control unit transports the card between the first moving position, which is on the near side with respect to the reference position, and the second moving position, which is on the far side with respect to the reference position, and in the second activation attempt step, attempts to activate the IC chip while gradually changing the stop position of the card from the reference position toward the first moving position until activation of the IC chip is successful, attempts to activate the IC chip while gradually changing the stop position of the card from the first moving position toward the second moving position, and then attempts to activate the IC chip while gradually changing the stop position of the card from the second moving position toward the first moving position.
(8) The card reader according to any one of (1) to (7), wherein when activation of the IC chip fails in the first activation attempt step, the control unit performs a third activation attempt step in which an attempt is made to activate the IC chip again with the card stopped in a predetermined third stop position before performing the card moving step.
(9) The card reader according to (8), wherein when activation of the IC chip is successful in the second activation attempt step, the control unit performs a stop position update step in which a stop position of the card when the activation of the IC chip is successful is set to the third stop position.
(10) A method of controlling a card reader including: a card transport path along which a card with an IC chip embedded and a plurality of external connection terminals formed for the IC chip is transported; a card transport mechanism to transport the card along the card transport path; a plurality of IC contact springs to contact each of the plurality of external connection terminals to communicate data; an IC contact block to hold the plurality of IC contact springs; and a block moving mechanism to move the IC contact block between a contactable position where the plurality of IC contact springs are allowed to contact the plurality of external connection terminals and a retreat position where the plurality of IC contact springs are not allowed to contact the plurality of external connection terminals, the method including:
a first activation attempt step of transporting the card to a predetermined reference position and stopping the card with the IC contact block positioned in the retreat position, and moving the IC contact block to the contactable position, then to attempt to activate the IC chip;
a card moving step of, when activation of the IC chip fails in the first activation attempt step, transporting and stopping the card within a range where the plurality of IC contact springs in contact with the plurality of external connection terminals do not come off the plurality of external connection terminals, with the IC contact block positioned in the contactable position; and
a second activation attempt step of, after the card moving step, stopping the card within a range where the card is moved in the card moving step, then to attempt to activate the IC chip.

In such an aspect, it is preferable that in the second activation attempt step, the control unit transports and stops the card with the IC contact block positioned in the contactable position. With such a configuration, it is possible to shorten the processing time in the second activation attempt step, compared to a case where, in the second activation attempt step, the card is transported and stopped with the IC contact block positioned in the retreat position, and the IC contact block is moved to the contactable position, then to attempt to activate the IC chip.

In such an aspect, in the second activation attempt step, it is preferable that the control unit attempts to activate the IC chip a predetermined number of times while changing the stop position of the card until activation of the IC chip is successful. With such a configuration, it is possible to further increase the probability that the IC chip can be activated.

In such an aspect, it is preferable that, when one side of a direction in which the card is transported by the card transport mechanism is defined as a near side, and the other side of the direction in which the card is transported by the card transport mechanism is defined as a far side, in the card moving step, the control unit transports the card between a first moving position that is on the near side with respect to the reference position and a second moving position that is on the far side with respect to the reference position, and when a position of the card that is on the far side with respect to the first moving position and is on the near side with respect to the reference position is defined as a first stop position, and a position of the card that is on the near side with respect to the second moving position and is on the far side with respect to the reference position is defined as a second stop position, in the second activation attempt step, the control unit attempts to activate the IC chip while changing the stop position of the card among the first stop position, the second stop position, and the reference position until activation of the IC chip is successful.

With such a configuration, it is possible for the plurality of IC contact springs to be brought into contact with places of the plurality of external connection terminals that are on the near side with respect to places where the plurality of IC contact springs contact when the card is positioned in the reference position, then to attempt to active the IC chip; and it is possible for the plurality of IC contact springs to be brought into contact with places of the plurality of external connection terminals that are on the far side with respect to places where the plurality of IC contact springs contact when the card is positioned in the reference position, then to activate the IC chip. Therefore, it is possible to further increase the probability that the IC chip can be activated.

In such an aspect, it is preferable that, in the second activation attempt step, the control unit repeats one cycle of activation attempts a plurality of times, in which an attempt is made to activate the IC chip while changing the stop position of the card in the order of the first stop position, the reference position, the second stop position, and the reference position, until activation of the IC chip is successful. With such a configuration, it is possible to shorten the movement time of the card to change the stop position of the card. Therefore, even though it is possible to further increase the probability that the IC chip can be activated, it is possible to shorten the processing time in the second activation attempt step.

In such an aspect, for example, in the card moving step, the control unit may transport the card at least between the reference position and a predetermined first moving position, and in the second activation attempt step, attempt to activate the IC chip while gradually changing the stop position of the card from the reference position toward the first moving position until activation of the IC chip is successful. In such a case, it is possible to shorten the movement time of the card to change the stop position of the card. Therefore, even though it is possible to further increase the probability that the IC chip can be activated, it is possible to shorten the processing time in the second activation attempt step.

In such an aspect, it is preferable that, in the card moving step, the control unit transports the card between a first moving position that is on the near side with respect to the reference position and a second moving position that is on the far side with respect to the reference position, and in the second activation attempt step, the control unit attempts to activate the IC chip while gradually changing the stop position of the card from the reference position toward the first moving position until activation of the IC chip is successful, attempts to activate the IC chip while gradually changing the stop position of the card from the first moving position toward the second moving position, and then attempts to activate the IC chip while gradually changing the stop position of the card from the second moving position toward the first moving position.

With such a configuration, it is possible for the plurality of IC contact springs to be brought into contact with places of the plurality of external connection terminals that are on the near side with respect to places where the plurality of IC contact springs contact when the card is positioned in the reference position, then to attempt to active the IC chip; and it is possible for the plurality of IC contact springs to be brought into contact with places of the plurality of external connection terminals that are on the far side with respect to places where the plurality of IC contact springs contact when the card is positioned in the reference position, then to activate the IC chip. Therefore, it is possible to further increase the probability that the IC chip can be activated.

In such an aspect, for example, when activation of the IC chip fails in the first activation attempt step, the control unit performs a third activation attempt step in which an attempt is made to activate the IC chip again with the card stopped in a predetermined third stop position before performing the card moving step.

In such an aspect, it is preferable that, when activation of the IC chip is successful in the second activation attempt step, the control unit performs a stop position update step in which the stop position of the card when the activation of the IC chip is successful is set to the third stop position. With such a configuration, it is possible to increase the probability of successful activation of the IC chip in the third activation attempt step.

What is claimed is:

1. A card reader to communicate data with a card with an IC chip embedded and a plurality of external connection terminals formed for the IC chip, the card reader comprising:
   a card transport path along which the card is transported;
   a card transport mechanism to transport the card along the card transport path; a plurality of IC contact springs to contact each of the plurality of external connection terminals to communicate data; an IC contact block to hold the plurality of IC contact springs; a block moving mechanism to move the IC contact block between a contactable position where the plurality of IC contact springs are allowed to contact the plurality of external connection terminals and a retreat position where the plurality of IC contact springs are not allowed to contact the plurality of external connection terminals; and a control unit to control the card reader,
   wherein the control unit performs:
   a first activation attempt step of transporting the card to a predetermined reference position and stopping the card with the IC contact block positioned in the retreat position, and moving the IC contact block to the contactable position, then to attempt to activate the IC chip;
   a card moving step of, when activation of the IC chip fails in the first activation attempt step, transporting and stopping the card within a range where the plurality of IC contact springs in contact with the plurality of external connection terminals do not come off the plurality of external connection terminals, with the IC contact block positioned in the contactable position; and
   a second activation attempt step of, after the card moving step, stopping the card within a range where the card is moved in the card moving step, then to attempt to activate the IC chip.

2. The card reader according to claim 1, wherein in the second activation attempt step, the control unit transports and stops the card with the IC contact block positioned in the contactable position.

3. The card reader according to claim 1, wherein in the second activation attempt step, the control unit attempts to activate the IC chip a predetermined number of times while changing a stop position of the card until activation of the IC chip is successful.

4. The card reader according to claim 3, wherein when one side of a direction in which the card is transported by the card transport mechanism is defined as a near side, and the other side of the direction in which the card is transported by the card transport mechanism is defined as a far side,
   in the card moving step, the control unit transports the card between a first moving position that is on the near side with respect to the reference position and a second moving position that is on the far side with respect to the reference position, and when a position of the card that is on the far side with respect to the first moving position and is on the near side with respect to the reference position is defined as a first stop position, and a position of the card that is on the near side with respect to the second moving position and is on the far side with respect to the reference position is defined as a second stop position, in the second activation attempt step, the control unit attempts to activate the IC chip while changing the stop position of the card among the first stop position, the second stop position, and the reference position until activation of the IC chip is successful.

5. The card reader according to claim 4, wherein in the second activation attempt step, the control unit repeats one cycle of activation attempts a plurality of times, in which an attempt is made to activate the IC chip while changing the stop position of the card in an order of the first stop position, the reference position, the second stop position, and the reference position, until activation of the IC chip is successful.

6. The card reader according to claim 3, wherein in the card moving step, the control unit transports the card at least between the reference position and a predetermined first moving position, and in the second activation attempt step, attempts to activate the IC chip while gradually changing the stop position of the card from the reference position toward the first moving position until activation of the IC chip is successful.

7. The card reader according to claim 6, wherein in the card moving step, the control unit transports the card between the first moving position, which is on the near side with respect to the reference position, and the second moving position, which is on the far side with respect to the reference position, and in the second activation attempt step, attempts to activate the IC chip while gradually changing the stop position of the card from the reference position toward the first moving position until activation of the IC chip is successful, attempts to activate the IC chip while gradually changing the stop position of the card from the first moving position toward the second moving position, and then attempts to activate the IC chip while gradually changing the stop position of the card from the second moving position toward the first moving position.

8. The card reader according to claim 1, wherein when activation of the IC chip fails in the first activation attempt step, the control unit performs a third activation attempt step in which an attempt is made to activate the IC chip again with the card stopped in a predetermined third stop position before performing the card moving step.

9. The card reader according to claim 8, wherein when activation of the IC chip is successful in the second activation attempt step, the control unit performs a stop position update step in which a stop position of the card when the activation of the IC chip is successful is set to the third stop position.

10. The card reader according to claim 2, wherein in the second activation attempt step, the control unit attempts to activate the IC chip a predetermined number of times while changing a stop position of the card until activation of the IC chip is successful.

11. The card reader according to claim 10, wherein when one side of a direction in which the card is transported by the card transport mechanism is defined as a near side, and the other side of the direction in which the card is transported by the card transport mechanism is defined as a far side,
   in the card moving step, the control unit transports the card between a first moving position that is on the near side with respect to the reference position and a second moving position that is on the far side with respect to the reference position, and when a position of the card that is on the far side with respect to the first moving position and is on the near side with respect to the reference position is defined as a first stop position, and a position of the card that is on the near side with respect to the second moving position and is on the far side with respect to the reference position is defined as a second stop position, in the second activation attempt step, the control unit attempts to activate the IC chip while changing the stop position of the card among the first stop position, the second stop position, and the reference position until activation of the IC chip is successful.

12. The card reader according to claim 11, wherein in the second activation attempt step, the control unit repeats one cycle of activation attempts a plurality of times, in which an attempt is made to activate the IC chip while changing the stop position of the card in an order of the first stop position, the reference position, the second stop position, and the reference position, until activation of the IC chip is successful.

13. The card reader according to claim 10, wherein in the card moving step, the control unit transports the card at least between the reference position and a predetermined first moving position, and in the second activation attempt step, attempts to activate the IC chip while gradually changing the stop position of the card from the reference position toward the first moving position until activation of the IC chip is successful.

14. The card reader according to claim 13, wherein in the card moving step, the control unit transports the card between the first moving position, which is on the near side with respect to the reference position, and the second moving position, which is on the far side with respect to the reference position, and in the second activation attempt step, attempts to activate the IC chip while gradually changing the stop position of the card from the reference position toward the first moving position until activation of the IC chip is successful, attempts to activate the IC chip while gradually changing the stop position of the card from the first moving position toward the second moving position, and then attempts to activate the IC chip while gradually changing the stop position of the card from the second moving position toward the first moving position.

15. The card reader according to claim 2, wherein when activation of the IC chip fails in the first activation attempt step, the control unit performs a third activation attempt step in which an attempt is made to activate the IC chip again with the card stopped in a predetermined third stop position before performing the card moving step.

16. The card reader according to claim 15, wherein when activation of the IC chip is successful in the second activation attempt step, the control unit performs a stop position update step in which a stop position of the card when the activation of the IC chip is successful is set to the third stop position.

17. A method of controlling a card reader comprising: a card transport path along which a card with an IC chip embedded and a plurality of external connection terminals formed for the IC chip is transported; a card transport mechanism to transport the card along the card transport path; a plurality of IC contact springs to contact each of the plurality of external connection terminals to communicate data; an IC contact block to hold the plurality of IC contact springs; and a block moving mechanism to move the IC contact block between a contactable position where the plurality of IC contact springs are allowed to contact the plurality of external connection terminals and a retreat position where the plurality of IC contact springs are not allowed to contact the plurality of external connection terminals, the method comprising:
   a first activation attempt step of transporting the card to a predetermined reference position and stopping the card with the IC contact block positioned in the retreat position, and moving the IC contact block to the contactable position, then to attempt to activate the IC chip;
   a card moving step of, when activation of the IC chip fails in the first activation attempt step, transporting and stopping the card within a range where the plurality of IC contact springs in contact with the plurality of external connection terminals do not come off the plurality of external connection terminals, with the IC contact block positioned in the contactable position; and a second activation attempt step of, after the card moving step, stopping the card within a range where the card is moved in the card moving step, then to attempt to activate the IC chip.

\* \* \* \* \*